(12) United States Patent
Shi et al.

(10) Patent No.: US 12,368,929 B2
(45) Date of Patent: Jul. 22, 2025

(54) VIDEO-BASED INTERACTION METHOD AND APPARATUS, STORAGE MEDIUM AND ELECTRONIC DEVICE

(71) Applicant: BEIJING YOUZHUJU NETWORK TECHNOLOGY CO., LTD., Beijing (CN)

(72) Inventors: Jiayi Shi, Beijing (CN); Yuchen Wang, Beijing (CN); Ye Yuan, Beijing (CN); Xu Zhong, Beijing (CN); Shun Liu, Beijing (CN)

(73) Assignee: BEIJING YOUZHUJU NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/485,845

(22) Filed: Oct. 12, 2023

(65) Prior Publication Data

US 2024/0040199 A1 Feb. 1, 2024

Related U.S. Application Data

(63) Continuation-in-part of application No. PCT/CN2022/081662, filed on Mar. 18, 2022.

(30) Foreign Application Priority Data

Apr. 12, 2021 (CN) .......................... 202110390199.3

(51) Int. Cl.
*G06T 7/70* (2017.01)
*H04N 21/431* (2011.01)
*H04N 21/472* (2011.01)

(52) U.S. Cl.
CPC ......... *H04N 21/47217* (2013.01); *G06T 7/70* (2017.01); *H04N 21/431* (2013.01)

(58) Field of Classification Search
CPC ... H04N 21/47217; H04N 21/431; G06T 7/70
See application file for complete search history.

(56) References Cited

U.S. PATENT DOCUMENTS

| 2015/0174478 A1 | 6/2015 | Barak |
| 2015/0181301 A1 | 6/2015 | Bloch et al. |

(Continued)

FOREIGN PATENT DOCUMENTS

| CN | 106998486 A | 8/2017 |
| CN | 110062270 A | 7/2019 |

(Continued)

OTHER PUBLICATIONS

International Search Report issued Jun. 1, 2022 for PCT Application No. PCT/CN2022/081662, English translation (6 pages).

(Continued)

*Primary Examiner* — Thai Q Tran
*Assistant Examiner* — Jose M Mesa

(57) ABSTRACT

The present disclosure relates to a video-based interaction method and apparatus, storage medium, and electronic device. The video-based interaction method comprises: when a target video is played to a target image frame, pausing playback of the target video, and displaying an obscuration comprising an interaction control on a current playback interface corresponding to the target image frame, wherein the interaction control is configured to perform a control operation on a target display object in the target image frame; and in response to a triggering operation of a user on the interaction control, displaying an interactive page comprising the target display object, and applying the control operation on the target display object on the interactive page.

10 Claims, 5 Drawing Sheets

---

When a target video is played to a target image frame, pausing playback of the target video, and displaying an obscuration comprising an interaction control on a current playback interface corresponding to the target image frame, wherein the interaction control is configured to perform a control operation on a target display object in the target image frame ⟶ 101

In response to a triggering operation of a user on the interaction control, displaying an interactive page comprising the target display object, and applying the control operation on the target display object on the interactive page ⟶ 102

(56) References Cited

U.S. PATENT DOCUMENTS

| | | | |
|---|---|---|---|
| 2016/0011758 A1* | 1/2016 | Dornbush | H04L 51/10 |
| | | | 715/764 |
| 2020/0336804 A1 | 10/2020 | Cui et al. | |
| 2022/0312065 A1 | 9/2022 | Han et al. | |
| 2022/0362666 A1 | 11/2022 | Hu et al. | |
| 2022/0370901 A1 | 11/2022 | Hu et al. | |
| 2023/0124461 A1 | 4/2023 | Lin et al. | |
| 2023/0161471 A1 | 5/2023 | Yuan et al. | |
| 2023/0244362 A1 | 8/2023 | Zhang et al. | |

FOREIGN PATENT DOCUMENTS

| | | |
|---|---|---|
| CN | 111603764 A | 9/2020 |
| CN | 111632373 A | 9/2020 |
| CN | 111669639 A | 9/2020 |
| CN | 111930996 A | 11/2020 |
| CN | 112138381 A | 12/2020 |
| CN | 112188255 A | 1/2021 |
| CN | 112261459 A | 1/2021 |
| CN | 113031842 A | 6/2021 |

OTHER PUBLICATIONS

First Office Action issued Mar. 23, 2022 in CN Application No. 202110390199.3, English translation (19 pages).
Second Office Action issued Aug. 8, 2022 in CN Application No. 202110390199.3, English translation (18 pages).
European Search Report for EP Patent Application No. 22787325.4, Issued on Jul. 10, 2024, 10 pages.

* cited by examiner

| When a target video is played to a target image frame, pausing playback of the target video, and displaying an obscuration comprising an interaction control on a current playback interface corresponding to the target image frame, wherein the interaction control is configured to perform a control operation on a target display object in the target image frame | ~101 |

| In response to a triggering operation of a user on the interaction control, displaying an interactive page comprising the target display object, and applying the control operation on the target display object on the interactive page | ~102 |

FIG.1

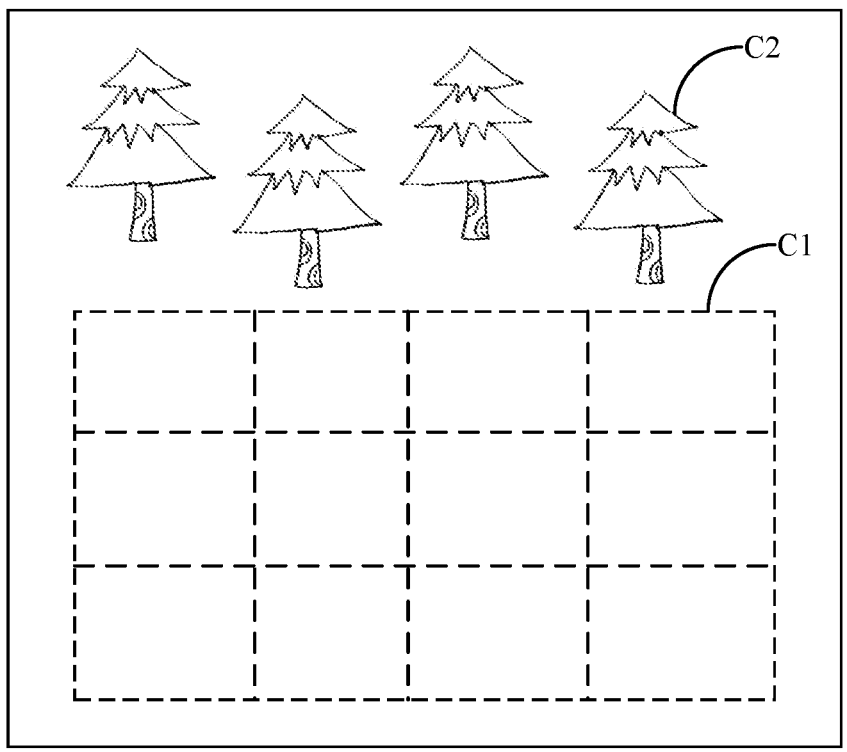

FIG.2

VIDEO-BASED INTERACTION METHOD AND APPARATUS, STORAGE MEDIUM AND ELECTRONIC DEVICE

CROSS-REFERENCE TO RELATED APPLICATIONS

The present disclosure is a U.S. National Stage Application under 35 U.S.C. § of International application No. PCT/CN2022/081662 filed on Mar. 18, 2022, which claims priority to the Chinese Patent Application No. 202110390199.3 filed on Apr. 12, 2021, and entitled "VIDEO-BASED INTERACTION METHOD AND APPARATUS, STORAGE MEDIUM AND ELECTRONIC DEVICE", the disclosure of which is incorporated by reference herein in its entirety.

TECHNICAL FIELD

The present disclosure relates to the field of video technologies, and in particular, to a video-based interaction method and apparatus, storage medium, computer program, computer program product, and electronic device.

BACKGROUND

Video may capture, record, process, store, transmit, and reproduce series of still images in form of electrical signals. With the increasing number of users of video applications, video-based interaction modes are receiving more and more attentions from people. However, in the related art, the interaction mode provided by the video applications to the users is usually limited to interaction control of video playback, such as interaction control in terms of video playing speed, playing volume, and the like, thus the interaction mode is single. If a user wants to experience other contents related to the video, the user has to manually exit the currently played video and enter a new experience page, which is complicated in operation.

SUMMARY

This SUMMARY is provided to introduce concepts in a simplified form and the concepts will be described in detail in the DETAILED DESCRIPTION which follows. This SUMMARY is not intended to identify key features or essential features of the claimed technical solution, nor is it intended to limit the scope of the claimed technical solution.

In a first aspect, the present disclosure provides a video-based interaction method, comprising:
  when a target video is played to a target image frame, pausing playback of the target video, and displaying an obscuration comprising an interaction control on a current playback interface corresponding to the target image frame, wherein the interaction control is configured to perform a control operation on a target display object in the target image frame; and
  in response to a triggering operation of a user on the interaction control, displaying an interactive page comprising the target display object, and applying the control operation on the target display object on the interactive page.

In a second aspect, the present disclosure provides a video-based interaction apparatus, comprising:
  a first display module configured to, when a target video is played to a target image frame, pause playback of the target video, and display an obscuration comprising an interaction control on a current playback interface corresponding to the target image frame, wherein the interaction control is configured to perform a control operation on a target display object in the target image frame; and
  a second display module configured to, in response to a triggering operation of a user on the interaction control, display an interactive page comprising the target display object, and apply the control operation on the target display object on the interactive page.

In a third aspect, the present disclosure provides a non-transitory computer readable medium having stored thereon a computer program which, when executed by a processing means, implements the steps of the method in the first aspect.

In a fourth aspect, the present disclosure provides an electronic device comprising:
  a storage means having a computer program stored thereon;
  a processing means configured to execute the computer program in the storage means to implement the steps of the method in the first aspect.

In a fifth aspect, the present disclosure provides a computer program comprising: instructions which, when executed by a processor, implement the steps of the method in the first aspect.

In a sixth aspect, the present disclosure provides a computer program product comprising instructions which, when executed by a processor, implement the steps of the method in the first aspect.

According to the foregoing technical solutions, when a target video is played to a target image frame, playback of the target video can be paused, an obscuration comprising an interaction control is displayed on a current playback interface corresponding to the target image frame, and therefore an interactive page can be jumped to through a triggering operation on the interaction control, such that the user can experience, on the interactive page, experience content related to target content, without the need of manually exiting playback of the target video by the user and then re-entering an experience page for experience, which reduces interaction complexity, and also enriches video functions. Moreover, a control operation triggered by the interaction control is applied to a target display object on the interactive page, so that the user's interactions with the target image frame can be joined to the interactive page, which ensures consistency of page content display, reduces abrupt feeling of the user for a jump of display content, and improves user experience.

Additional features and advantages of the present disclosure will be set forth in detail in the DETAILED DESCRIPTION which follows.

BRIEF DESCRIPTION OF THE DRAWINGS

The above and other features, advantages, and aspects of embodiments of the present disclosure will become more apparent by referring to the following DETAILED DESCRIPTION in conjunction with the accompanying drawings. Throughout the drawings, the same or similar reference numbers refer to the same or similar elements. It should be understood that the drawings are schematic and that elements and components are not necessarily drawn to scale. In the drawings:

FIG. 1 is a flow chart of a video-based interaction method illustrated according to an exemplary embodiment of the present disclosure;

FIG. 2 is a schematic diagram of a target image frame in a video-based interaction method illustrated according to an exemplary embodiment of the present disclosure;

DETAILED DESCRIPTION

Figure 3:
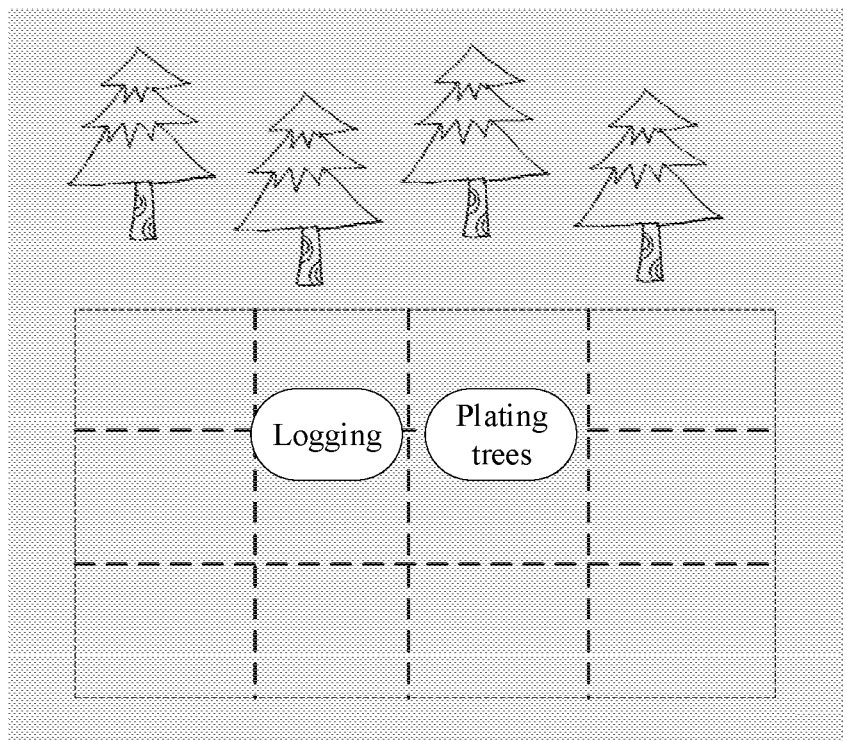
FIG. 3 is a schematic diagram of displaying an obscuration on the target image frame shown in FIG. 2.

The embodiments of the present disclosure will be described in more detail below with reference to the accompanying drawings. While certain embodiments of the present disclosure are shown in the drawings, it should be understood that the present disclosure may be embodied in various forms and should not be construed as limited to the embodiments set forth herein, but rather these embodiments are provided for a more complete and thorough understanding of the present disclosure. It should be understood that the drawings and the embodiments of the disclosure are for illustration only and are not intended to limit the scope of the disclosure.

It should be understood that the various steps recited in method embodiments of the present disclosure may be performed in a different order, and/or performed in parallel. Moreover, the method embodiments may include additional steps and/or omit performing the illustrated steps. The scope of the present disclosure is not limited in this respect.

The term "comprising" and variations thereof as used herein are intended to be open-ended, i.e., "comprising but not limited to". The term "based on" is "based at least in part on". The term "one embodiment" means "at least one embodiment"; the term "another embodiment" means "at least one additional embodiment"; the term "some embodiments" means "at least some embodiments". Relevant definitions for other terms will be given in the following description.

It should be noted that the concepts "first", "second", and the like mentioned in the present disclosure are only used for distinguishing different devices, modules or units, and are not used for limiting the order or interdependence of the functions performed by the devices, modules or units.

It should be noted that references to "a", "an" or "a plurality of" in this disclosure are intended to be illustrative rather than limiting, and those skilled in the art should appreciate that, the references to "a", "an" or "a plurality of" should be understood as "one or more" unless otherwise explicitly stated in the context.

The names of messages or information exchanged between devices in the embodiments of the present disclosure are for illustrative purposes only, and are not intended to limit the scope of the messages or information.

As the BACKGROUND states, the interaction mode provided by the video applications to the users in the related art is usually limited to interaction control of video playback, such as interaction control in video playing speed, playing volume, and the like, and thus the interaction mode is single. If the user wants to experience other contents related to the video, the user has to exit the currently played video and then enter a new experience page, which is complicated in operation.

In view of this, the present disclosure provides a video-based interaction method and apparatus, storage medium, computer program, computer program product, and electronic device, to provide richer video interaction modes based on forms of the target video, the interaction obscuration, and the interactive page, so that the user can experience the experience content related to the target video without the need of manually exiting the current video playback interface, which reduces interaction complexity.

FIG. 1 is a flowchart of a video-based interaction method illustrated according to an exemplary embodiment of the present disclosure. Referring to FIG. 1, the method comprises:

step 101, when a target video is played to a target image frame, pausing playback of the target video, and displaying an obscuration comprising an interaction control on a current playback interface corresponding to the target image frame, wherein the interaction control is configured to perform a control operation on a target display object in the target image frame.

Illustratively, the target image frame may be preset according to playing content of the target video. For example, an image frame in which the target display object appears for the first time in all image frames corresponding to the target video may be set as the target image frame, for subsequent interaction with the target display object, or an image frame played at a preset time moment of the target video may be set as the target image frame, for example, an image frame played at the 6 th second of the target video is set as the target image frame, and the like, which is not limited in the embodiments of the present disclosure.

Illustratively, the target display object may be a person object, an item object, or the like in the target image frame, which is not limited in the embodiments of the present disclosure. For example, the target image frame is an image frame including person A1 and person A2, then the target display object may be this person A1 or person A2. The interaction control is configured to perform a control operation on the target display object in the target image frame. The control operation may be an operation for controlling the target display object to act or an operation for applying an action to the target display object. It should be understood that the display content of the interaction control may be content related to the performance of the control operation. For example, if the control operation is to control the target display object to move forward, the display content of the interaction control may be "move forward". In addition, it should be understood that the target display object may include at least one display object, and accordingly, the interaction control may be at least one control in one-to-one correspondence with the at least one display object.

Step 102, in response to a triggering operation of a user on the interaction control, displaying an interactive page comprising the target display object, and applying the control operation on the target display object on the interactive page.

Illustratively, the triggering operation may be a click operation, a drag operation, a swipe operation, or a long-press operation on the interaction control, and the like, which is not limited in the embodiments of the disclosure. It should be understood that different triggering operations for the same interaction control may perform different control operations on the target display object. For example, in the case where the target video is a game video, the target display object is a game character B, and the game character B can be controlled to release game skills by a click operation on the interaction control, and the game skills can be applied to the game character B by a long-press operation on the interaction control, and so on.

Illustratively, the interactive page is a page in which a user can interactively control at least one display object in the page. For example, in the case where the target video is a game video, the target display object is a game character B, and the user can perform interaction control on the game character B in the interactive page, such as controlling the movement of the game character B, releasing game skills, and the like.

Figure 4:
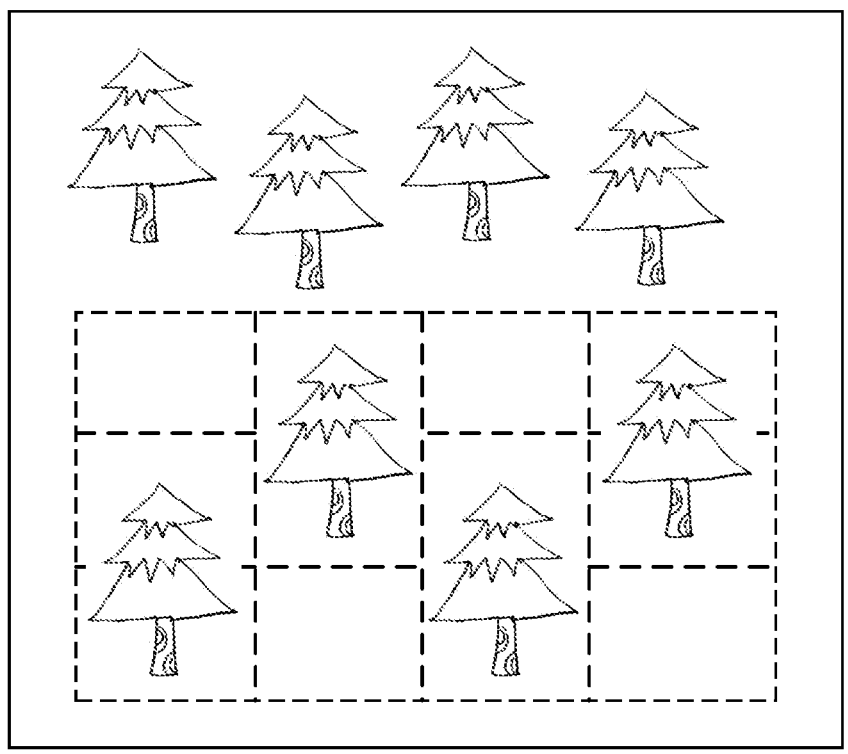
FIG. 4 is a schematic diagram of an interactive page displayed on the obscuration shown in FIG. 3 according to a triggering operation of a user.

For example, referring to FIG. 2, a target video is played to a target image frame, and playback of the target video is paused. The target image frame is an image frame including a target display object C1 and a target display object C2, wherein the target display object C1 is characterized as "land" and the target display object C2 is characterized as "trees". While the playback of the target video is paused, an obscuration comprising an interaction control is displayed on a current playback interface of the target image frame, as shown in FIG. 3. The interaction control comprises a first control with the display content of "logging" and a second control with the display content of "planting trees". The first control is used for applying a control operation "logging" on the target display object "trees". The second control is used for applying a control operation "planting trees" on the target display object "land". If the user clicks the second control, an interactive page as shown in FIG. 4 may be displayed. The interactive page includes the target display objects "land" and "trees", and the control operation "planting trees" is applied on the target display object "land" on the interactive page.

It should be understood that an initial display content of the interactive page and the display content of the target image frame may be the same, and then the control operation corresponding to the triggering operation is applied on the target display object on the interactive page, so that the user may view an interactive process of applying the corresponding control operation on the target display object, for example, in the above example, the user may view the interactive process of applying the control operation "planting trees" on the target display object "land", that is, the user may view a display change process from FIG. 2 to FIG. 4.

Thereafter, the user may also perform possible interactive operations on any target display object on the interactive page, which is not limited in the embodiments of the disclosure. In addition, specific content of the control operation corresponding to the interaction control may be preset according to an actual situation, which is also not limited in the embodiments of the present disclosure. For example, in the above example, after the control operation "planting trees" is applied on the target display object "land", specific service execution may be as shown in FIG. 4. In other cases, the control operation "planting trees" may be sequentially performed on the target display object "land" until all operable display areas of the target display object "land" are subjected to the control operation "planting trees", and so on.

Therefore, the user can experience, on the interactive page, experience content related to the target video, and in situations of a game, trial play of the game can be realized, without requiring the user to manually exit the playback of the target video and then re-enter an experience page for experience, which reduces interaction complexity, and enriches video functions. In addition, the control operation triggered by the interaction control is applied to the target display object on the interactive page, so that interaction information of the user in the obscuration can be brought into the interactive page, which ensures consistency of page content display, reduces abrupt feeling of the user for a jump of display content, and improves user experience.

In a possible implementations, a display position of the interaction control in the obscuration may be determined by: firstly determining a display position of the target display object in the target image frame, and then controlling the display position of the interaction control in the obscuration based on the display position of the target display object, so that the display position of the interaction control in the obscuration is within the display area range of the target display object.

Figure 5:
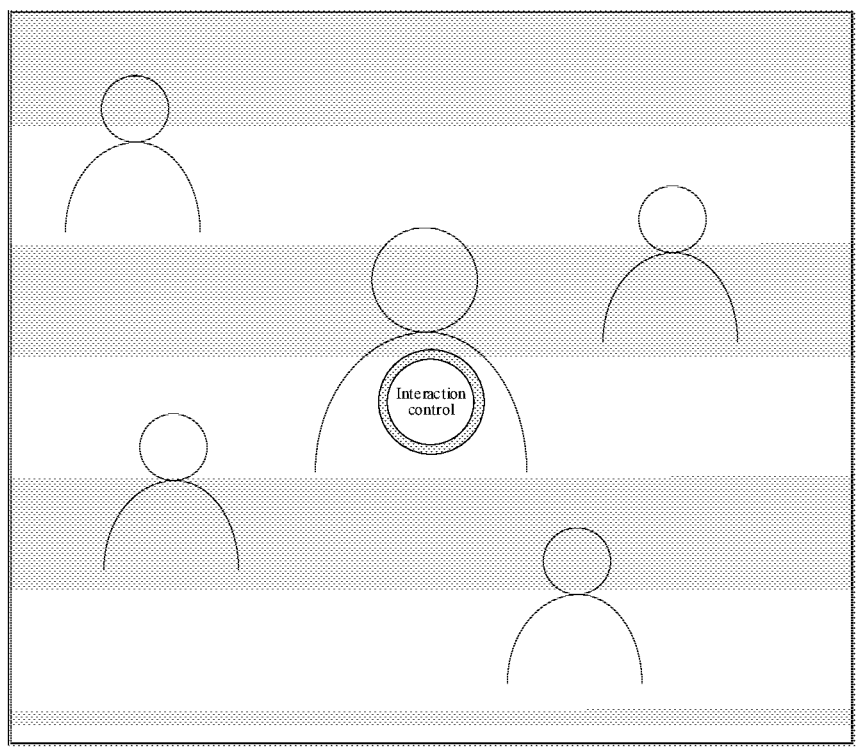
FIG. 5 is a schematic diagram of an obscuration in a video-based interaction method illustrated according to another exemplary embodiment of the present disclosure.

That is to say, the display position of the interaction control may be determined according to the display position of the target display object in the target image frame, so as to better guide the user to perform a corresponding control operation on the target display object. For example, referring to FIG. 5, the target image frame includes a person displayed in the middle, and the person is the target display object. Under this condition, according to the display position of this person in the middle, the display position of the interaction control in the obscuration can be controlled in the middle, such that the display position of interaction control in the obscuration is within the display area range of the target display object, for the convenience of an accurate control operation on the target display object.

In a possible implementation, the in response to the triggering operation of the user on the interaction control, displaying the interactive page comprising the target display object may be: in response to a long-press operation of the user on the interaction control, loading a long-press progress bar according to a long-press duration of the user on the interaction control, and displaying the interactive page comprising the target display object after the long-press progress bar is completely loaded, wherein the long-press progress bar is completely loaded when the long-press duration reaches a preset long-press threshold.

Figure 6:
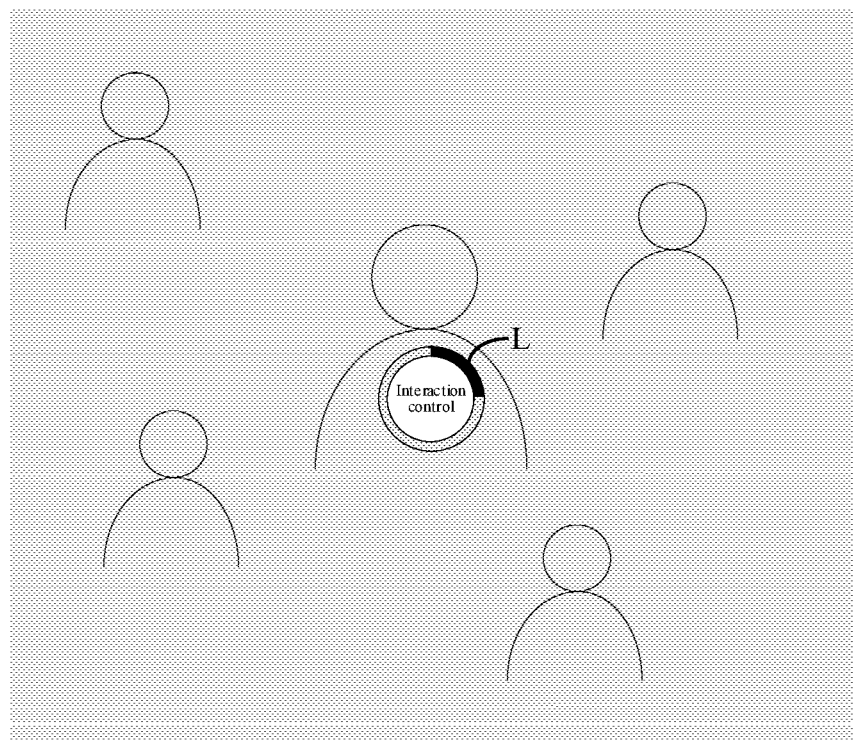
FIG. 6 is a schematic diagram of loading a long-press progress bar according to a long-press operation of a user on the obscuration shown in FIG. 5.

Illustratively, the preset long-press threshold may be a time threshold set according to an actual situation, and if the long-press duration of the user reaches the preset long-press threshold, the interactive page may be displayed, and the control operation corresponding to the interaction control may be applied to the target display object on the interactive page. In this process, in order to facilitate the user to know the progress of the long-press operation, the long-press progress bar can be loaded according to the long-press duration. For example, in the scenario shown in FIG. 5, further referring to FIG. 6, in response to the long-press operation of the user on the interaction control, a long-press progress bar L is loaded according to the long-press duration of the user on the interaction control. If the long-press progress bar L is completely loaded, it shows that the long-press duration of the user on the interaction control reaches the preset long-press threshold, and therefore the interactive page can be displayed.

That is to say, the embodiments of the present disclosure support the long-press operation on the interaction control, and in order to facilitate the user to know the progress of the long-press operation, after the user triggers the long-press operation, a long-press progress bar may be loaded according to the long-press duration of the user, and then after the long-press progress bar is completely loaded, the interactive page may be displayed. Therefore, the user can know the progress of the long-press operation according to the long-press progress bar, which reduces the occurrence of a situation that the user exits the interaction obscuration or even the video playback interface after long-press for a certain time and before jumping to a landing page.

It should be understood that, in order to accurately identify the long-press operation of the user on the interaction control, it may be determined that the long-press operation is triggered by the user on the interaction control when a finger of the user is detected to stay in a preset region around the interaction control for more than 1 second. The preset region may be, for example, a region of 20 pixels around the interaction control, that is, a distance between the boundary line of the preset region and the boundary line of the interaction control may be 20 pixels, or the like, which is not limited in the embodiments of the present disclosure.

In a possible implementation, the obscuration can have a preset display duration, and in this case, prompt content for guiding the user to perform a triggering operation on the interaction control can be displayed on the obscuration, and a display duration of the prompt content is determined, then under the condition that the display duration of the prompt content reaches a preset duration threshold, if the triggering operation of the user on the interaction control is not received, the obscuration is controlled to disappear, and after the obscuration disappears, the target video continues to be played based on the target image frame.

It should be understood that, in the process of displaying the obscuration, the target video is in a playback-paused state, and in an actual application, a user may or may not perform a triggering operation on the interaction control on the obscuration. Therefore, in order to ensure normal playback of the target video when the user does not perform a triggering operation on the interaction control on the obscuration, in the embodiments of the present disclosure, a preset display duration may be set for the obscuration, and if the user does not perform a triggering operation on the interaction control within the preset display duration, it can be determined that the user will not perform a triggering operation on the interaction control on the obscuration, so that the obscuration may be controlled to disappear, and the target video continues to be played based on the target image frame after the obscuration disappears.

Figure 7:
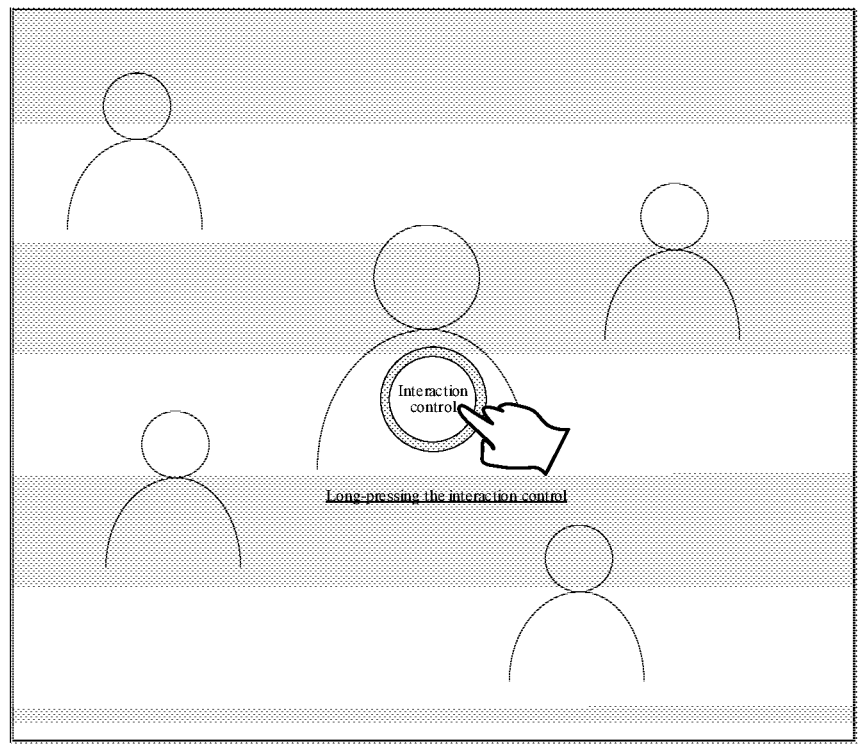
FIG. 7 is a schematic diagram of displaying prompt content for guiding a user to perform a triggering operation on an interaction control in an obscuration, in a video-based interaction method illustrated according to another exemplary embodiment of the present disclosure.

Further, the obscuration can display prompt content for guiding a user to perform a triggering operation on the interaction control. For example, simulated gesture content may be displayed to guide the user to perform the triggering operation on the interaction control, or text prompt content may be displayed to guide the user to perform the triggering operation on the interaction control, and so on, or, as shown in FIG. 7, the simulated gesture content and the text prompt content may be displayed at the same time to guide the user to perform the triggering operation on the interaction control, which is not limited in the embodiments of the present disclosure.

Under the condition that the obscuration displays the prompt content for guiding the user, since the prompt content is displayed on the obscuration, the display duration of the prompt content is the same as the preset display duration of the obscuration, so that the display duration of the prompt content can be recorded, then under the condition that the display duration of the prompt content reaches the preset duration threshold, if the triggering operation of the user on the interaction control is not received, the obscuration is controlled to disappear, and after the obscuration disappears, the target video continues to be played based on the target image frame. Therefore, not only the user can be guided to perform a triggering operation on the interaction control through the prompt content, but also normal playback of the target video can be guaranteed under the condition that the user does not perform the triggering operation on the interaction control on the obscuration, which automatically achieves display conversion from the obscuration to the target video, and improves interaction intelligence.

In a possible implementation, before the obscuration is controlled to disappear, prompt content for characterizing a remaining display duration of the obscuration can also be displayed, and accordingly, the obscuration is controlled to disappear while the remaining display duration of the obscuration returns to zero. For example, when the prompt content for guiding the user is displayed to the 5th to last second, the remaining display duration of the obscuration may be displayed in a countdown manner, that is, countdown time 5 seconds, 4 seconds, . . . , and 1 second may be sequentially displayed. If the triggering operation of the user on the interaction control is not received under the condition that the display duration of the prompt content reaches the preset duration threshold, the obscuration is controlled to disappear while the countdown time is zero. If the triggering operation of the user on the interaction control is received before the display duration of the prompt content reaches the preset duration threshold, countdown is stopped and the interactive page is displayed. In the implementation, the remaining display duration of the obscuration can be displayed to the user more intuitively, to facilitate the user to perform the triggering operation on the interaction control within the displayable time of the obscuration.

In a possible implementation, card display content related to the playing content of the target video and display position information corresponding to the card display content can be obtained, and then after the obscuration disappears, the card display content is displayed in the playback interface of the target video according to the display position information.

It should be understood that the content is often displayed in a form of a landing page or a card. The card content can be suspended and displayed over other content, and by clicking the card content, a corresponding landing page can be jumped to. In the embodiments of the present disclosure, the card display content may be advertisement content, experience content, and the like displayed in a card manner and related to the playing content of the target video. Specific content and display position information of the card display content may be preset, which is not limited in the embodiments of the disclosure. For example, in the case where the target video is a game video, the card display content may be advertisement content related to the game, and the display position information may be position information characterizing a lower right side of the playback interface of the target video, etc.

In the implementation, after the obscuration disappears, the related experience content is displayed in the playback interface of the target video in a card manner, so that the user can more conveniently know other content such as the experience content related to the target video after the obscuration disappears. If the user wants to further experience the experience content related to the target video, the user can enter the corresponding experience page through a clicking operation and the like on the card experience content, without the need of manually exiting the playback interface of the target video and then entering the experience page again, which reduces interaction complexity.

In a possible implementation, the obscuration can further comprise a replay control, accordingly, the obscuration can be controlled to disappear in response to a triggering operation of the user on the replay control, then the target video is controlled to be replayed after the obscuration disappears, and when the target video is replayed to the target image frame, the obscuration comprising the interaction control is redisplayed on a current playback interface corresponding to the target image frame.

That is, after the obscuration is displayed, if the user wants to return to the video playback interface to watch the target video again, the replay control on the obscuration can be triggered, to control the obscuration to disappear, and the target video is automatically replayed after the obscuration disappears. Thereafter, when the target video is replayed to the target image frame, the obscuration comprising the interaction control can also be displayed on the current playback interface corresponding to the target image frame, so that the user can conveniently perform an interactive operation on the target display object again. In addition, in the implementation, if the user wants to watch the target video again when the obscuration is displayed, the user does not need to manually exit the obscuration and then perform control of replay on the playback interface of the target video, but can directly perform the control of replay on the obscuration, which simplifies interactive process and improves user experience.

In a possible implementation, the obscuration further comprises a conversion component for, in response to a triggering operation of the user, displaying a content detail page corresponding to the target video. Accordingly, the display of the obscuration comprising the interaction control may be display of the obscuration comprising the interaction control in full screen, and the obscuration may be zoomed out to a first display area on the screen in response to the triggering operation of the user on the conversion component, and the content detail page corresponding to the target video is displayed in a second display area on the screen, where the first display area and the second display area are different.

Illustratively, the content detail page may be detailed introductory information about the target video. For example, if the target video is a game video, the content detail page may be detailed introductory information about the game. In the embodiment of the disclosure, in order to increase interactive immersion of the user, the obscuration comprising the interaction control can be displayed in full screen in a form of a landing page. In this case, if the user performs a triggering operation on the conversion component on the obscuration, that is, it is needed to display the content detail page corresponding to the target video, in order not to affect the triggering operation of the user on the interaction control on the obscuration, the obscuration and the content detail page may be displayed on the screen in a split-screen mode, that is, in response to the triggering operation of the user on the conversion component, the obscuration may be zoomed out to the first display area on the screen, and the content detail page may be displayed in the second display area on the screen.

Illustratively, the first display area and the second display area may be any screen display area set according to actual situations as long as the first display area and the second display area are different. For example, in response to the triggering operation of the user on the conversion component, the obscuration is zoomed out to a left half of the screen to be displayed, and the content detail page is displayed in a right half of the screen. Alternatively, in response to the triggering operation of the user on the conversion component, the obscuration is zoomed out to an upper half of the screen to be displayed, and the content detail page is displayed in a lower half of the screen, which is not limited by the embodiments of the present disclosure.

In the implementation, the obscuration comprising the interaction control and the content detail page corresponding to the target video can be displayed in a split-screen mode, in response to the triggering operation of the user on the conversion component, and compared with the manner of jumping from the obscuration to the display of the content detail page in full screen, user interactive operations of jumping from the content detail page back to the obscuration again can be reduced, and interaction flexibility is improved.

In a possible implementation, the target video is a video related to a target application, the obscuration may further comprise a download control, and accordingly, a download page for downloading the target application may be displayed in response to a triggering operation of the user on the download control, so that the user can download the target application on the download page; or, in response to the triggering operation of the user on the download control, the target application is downloaded, and prompt content for characterizing a download progress of the target application is displayed in the obscuration.

That is to say, the embodiments of the present disclosure provide two download modes for the target application related to the target video. The first one is to display a download page after triggering the download control, for example, to display an application store page etc. for downloading the target application, so that the user can download the target application in the download page. The second one is to directly download the target application after the download control is triggered, and to display in the obscuration prompt content for characterizing a download progress, so that the user can know the download progress. Therefore, downloading requirements of different users for the target application can be met.

For example, for an electronic device with an operating system being an Android operating system, the target application may be downloaded in response to the triggering operation of the user on the download control, and prompt content for characterizing the download progress of the target application is displayed in the obscuration. For example, the prompt content may be a download progress bar, a download percentage, and the like, which is not limited in the embodiments of this disclosure. For an electronic device with an operating system being an IOS operating system, the application store page corresponding to the target application can be displayed in response to the triggering operation of the user on the download control, so that the user can download the target application in the application store page.

In a possible implementation, an exit control can be arranged on the interactive page, and after the user performs a triggering operation on the exit control, the interactive page can be exited and returned to the obscuration display interface or the playback interface of the target video. Specifically, whether the interactive page is returned to the obscuration or the playback interface of the target video can be set according to actual needs, which is not limited in the embodiments of the present disclosure. If the playback interface of the target video is returned to, the target video can be continued to be played based on the target image frame.

In addition, it should be understood that, during the display of the obscuration, a background sound effect corresponding to the target video may be played, for example, music corresponding to the target video may be played, or the like. Similarly, in the process of performing a triggering operation of the user on the interaction control, a sound effect or a vibration prompt corresponding to the triggering operation may be played, for example, in the case of a click operation, a corresponding first sound effect or a vibration prompt is played; in the case of a long-press operation, a corresponding second sound effect or a vibration prompt is played, and so on, which is not limited in the embodiments of this disclosure.

In any of the above implementations, the user can experience, on the interactive page, experience content related to the target video, and in situations of a game, trial play of the game can be realized, without requiring the user to manually exit playback of the target video and then re-enter an experience page for experience, which reduces interaction complexity and enriches video functions. In addition, applying the control operation triggered by the interaction control to the target display object on the interactive page can bring interaction information of the user in the obscuration into the interactive page, which ensures consistency of page content display, reduces abrupt feeling of the user for a jump of display content, and improves user experience.

Figure 8:
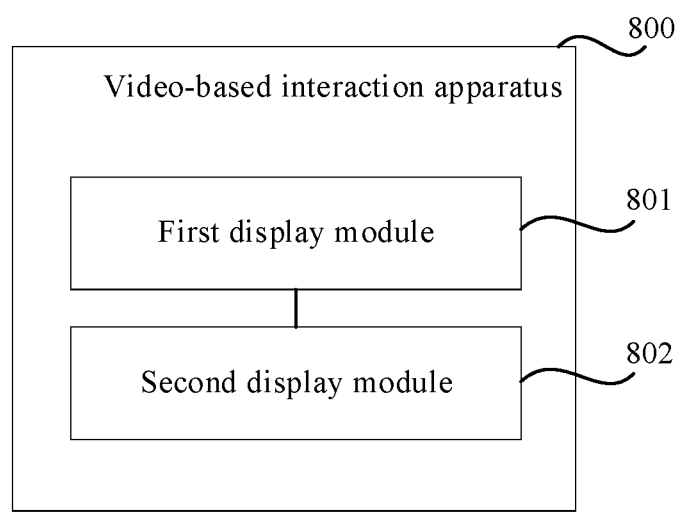
FIG. 8 is a block diagram of a video-based interaction apparatus illustrated according to an exemplary embodiment of the present disclosure.

Based on the same inventive concept, the embodiments of the present disclosure further provide a video-based interaction apparatus, which may become part or whole of an electronic device through software, hardware, or a combination of both. Referring to FIG. 8, the video-based interaction apparatus 800 comprises:
  a first display module 801 configured to, when a target video is played to a target image frame, pause playback of the target video, and display an obscuration comprising an interaction control on a current playback interface corresponding to the target image frame, wherein the interaction control is configured to perform a control operation on a target display object in the target image frame; and
  a second display module 802 configured to, in response to a triggering operation of a user on the interaction control, display an interactive page comprising the target display object, and apply the control operation on the target display object on the interactive page.

Optionally, a display position of the interaction control in the obscuration is determined by:
  a first determining module configured to determine a display position of the target display object in the target image frame; and
  a first control module configured to control the display position of the interaction control in the obscuration based on the display position of the target display object, so that the display position of the interaction control in the obscuration is within a display area range of the target display object.

Optionally, the second display module 802 is configured to:
  in response to a long-press operation of the user on the interaction control, load a long-press progress bar according to a long-press duration of the user on the interaction control; and
  after the long-press progress bar is completely loaded, display the interactive page comprising the target display object, wherein the long-press progress bar is completely loaded when the long-press duration reaches a preset long-press threshold.

Optionally, the obscuration has a preset display duration, and the apparatus 800 further comprises:
  a third display module configured to display, on the obscuration, prompt content for guiding the user to perform the triggering operation on the interaction control, and determine a display duration of the prompt content; and
  a second control module configured to control the obscuration to disappear if the triggering operation of the user on the interaction control is not received under the condition that the display duration of the prompt content reaches a preset duration threshold, and continue to play the target video based on the target image frame after the obscuration disappears.

Optionally, the apparatus 800 further comprises:
  a fourth display module configured to display prompt content for characterizing a remaining display duration of the obscuration before the second control module controls the obscuration to disappear;
  the second control module is configured to:
  control the obscuration to disappear while the remaining display duration of the obscuration returns to zero.

Optionally, the apparatus 800 further comprises:
  an acquisition module configured to acquire card display content related to playing content of the target video and display position information corresponding to the card display content; and
  a fifth display module configured to display the card display content in a playback interface of the target video according to the display position information after the obscuration disappears.

Optionally, the obscuration further comprises a replay control, and the apparatus 800 further comprises:
  a third control module configured to, in response to a triggering operation of the user on the replay control, control the obscuration to disappear; and
  a fourth control module configured to control the target video to be replayed after the obscuration disappears, and redisplay the obscuration comprising the interaction control on the current playback interface corresponding to the target image frame when the target video is replayed to the target image frame.

Optionally, the obscuration further comprises a conversion component, and the first display module 801 is configured to:
  display the obscuration comprising the interaction control in full screen;
  the apparatus 800 further comprises:
  a sixth display module, configured to zoom out the obscuration to a first display area on a screen in response to a triggering operation of the user on the conversion component, and display a content detail page corresponding to the target video in a second display area on the screen, where the first display area and the second display area are different.

Optionally, the target video is a video related to a target application, the obscuration further comprises a download control, and the apparatus 800 further comprises:

a first downloading module configured to, in response to a triggering operation of the user on the download control, display a download page for downloading the target application so that the user downloads the target application on the download page; or a second downloading module configured to, in response to the triggering operation of the user on the download control, download the target application and display prompt content for characterizing a download progress of the target application in the obscuration.

With regard to the apparatus in the above embodiments, specific manners in which each module performs the operation have been described in detail in the embodiments related to the method, and will not be described in detail here.

Based on the same inventive concept, the embodiments of the present disclosure further provide a computer readable medium, on which a computer program is stored, and the computer program, when executed by a processing means, implements the steps of any of the video-based interaction methods described above.

Based on the same inventive concept, the embodiments of the present disclosure further provide a computer program, including: instructions, and the instructions, when executed by a processor, implement the steps of any of the video-based interaction methods described above.

Based on the same inventive concept, the embodiments of the present disclosure further provide a computer program product comprising instructions, and the instructions, when executed by a processor, implement the steps of any of the video-based interaction methods described above.

Based on the same inventive concept, the embodiments of the present disclosure further provide an electronic device, comprising:

a storage means having a computer program stored thereon; and a processing means configured to execute the computer program in the storage means to implement the steps of any of the video-based interaction methods described above.

Figure 9:
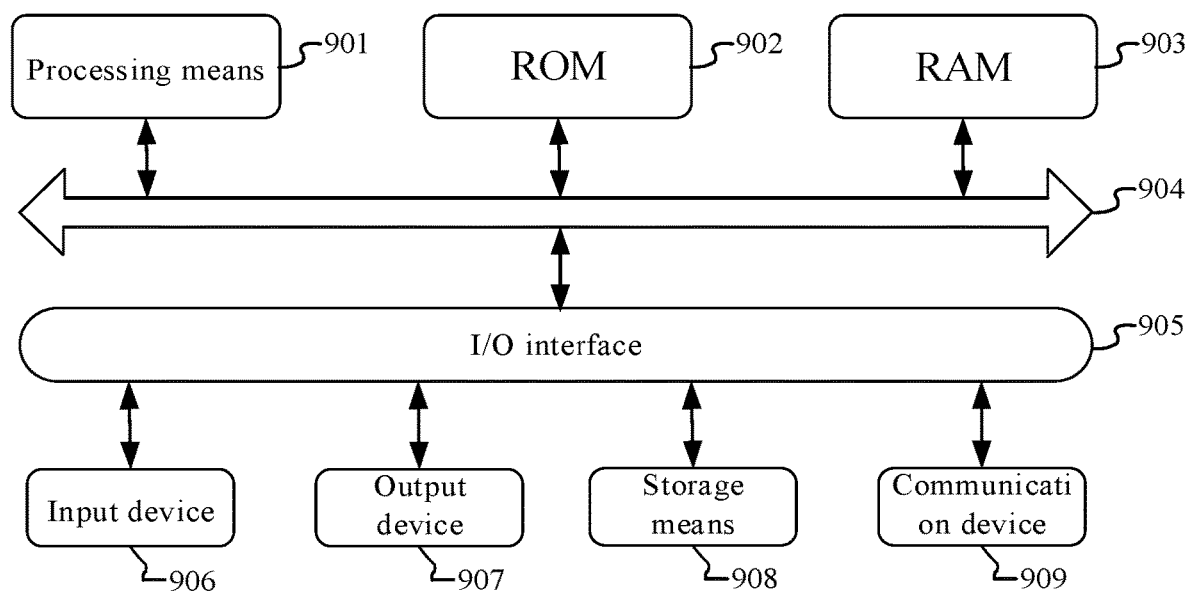
FIG. 9 is a block diagram of an electronic device illustrated according to an exemplary embodiment of the present disclosure.

Referring now to FIG. 9, which shows a schematic structural diagram of an electronic device 900 suitable for use in implementing the embodiments of the present disclosure. The terminal device in the embodiments of the present disclosure may include, but is not limited to, mobile terminals such as a mobile phone, a notebook computer, a digital broadcast receiver, a PDA (personal digital assistant), a PAD (tablet computer), a PMP (portable multimedia player), a vehicle terminal (e.g., a car navigation terminal), and the like, and fixed terminals such as a digital Television (TV), a desktop computer, and the like. The electronic device shown in FIG. 9 is only an example, and should not bring any limitation to the functions and the use range of the embodiments of the present disclosure.

As shown in FIG. 9, the electronic device 900 may comprise a processing means (e.g., a central processing unit, a graphics processor, etc.) 901 that may perform various appropriate actions and processes according to a program stored in a Read Only Memory (ROM) 902 or a program loaded from a storage means 908 into a Random Access Memory (RAM) 903. In the RAM 903, various programs and data necessary for the operation of the electronic device 900 are also stored. The processing means 901, ROM 902, and RAM 903 are connected to each other via a bus 904. An input/output (I/O) interface 905 is also connected to the bus 904.

Generally, the following devices may be connected to the I/O interface 905: an input device 906 including, for example, a touch screen, touch pad, keyboard, mouse, camera, microphone, accelerometer, gyroscope, etc.; an output device 907 including, for example, a Liquid Crystal Display (LCD), a speaker, a vibrator, etc.; a storage means 908 including, for example, a magnetic tape, hard disk, etc.; and a communication device 909. The communication device 909 may allow the electronic device 900 to communicate with other devices wirelessly or by wire to exchange data. While FIG. 9 illustrates the electronic device 900 having various means, it is to be understood that not all illustrated means are required to be implemented or provided. More or fewer means may be alternatively implemented or provided.

In particular, the processes described above with reference to the flow diagrams may be implemented as computer software programs, according to the embodiments of the present disclosure. For example, the embodiments of the present disclosure contain a computer program product comprising a computer program carried on a non-transitory computer readable medium, the computer program comprising program code for performing the method illustrated by the flow diagrams. In such an embodiment, the computer program may be downloaded and installed from a network through the communication device 909, or installed from the storage means 908, or installed from the ROM 902. The computer program, when executed by the processing means 901, performs the above-described functions defined in the methods of the embodiments of the present disclosure.

It should be noted that the above computer readable medium of the present disclosure may be a computer readable signal medium or a computer readable storage medium or any combination of both. The computer readable storage medium may be, for example, but not limited to, an electronic, magnetic, optical, electromagnetic, infrared, or semiconductor system, apparatus, or device, or any combination of the foregoing. More specific examples of the computer readable storage medium may include, but are not limited to: an electrical connection having one or more wires, a portable computer diskette, a hard disk, a Random Access Memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer readable storage medium may be any tangible medium that can contain, or store a program for use by or in connection with an instruction execution system, apparatus, or device. In contrast, in the present disclosure, the computer readable signal medium may include data signal that propagates in baseband or as part of a carrier wave and has computer readable program code embodied therein. Such a propagated data signal may take any of a variety of forms, including, but not limited to, electro-magnetic, optical, or any suitable combination thereof. The computer readable signal medium may be any computer readable medium other than the computer readable storage medium and can communicate, propagate, or transport a program for use by or in connection with an instruction execution system, apparatus, or device. Program code embodied on the computer readable medium may be transmitted using any appropriate medium, including but not limited to: electrical wires, optical cables, RF (radio frequency), etc., or any suitable combination of the foregoing.

In some embodiments, communication may be made via any currently known or future developed network protocol, such as HTTP (HyperText Transfer Protocol), and interconnection may be made with any form or medium of digital data communication (e.g., a communication network). Examples of communication networks include a local area network ("LAN"), a wide area network ("WAN"), an internet (e.g., the Internet), and peer-to-peer networks (e.g., ad hoc peer-to-peer networks), as well as any currently known or future developed network.

The above computer readable medium may be included in the above electronic device; or may be separate and not incorporated into the electronic device.

The above computer readable medium carries one or more programs which, when executed by the electronic device, cause the electronic device to: when a target video is played to a target image frame, pausing playback of the target video, and displaying an obscuration comprising an interaction control on a current playback interface corresponding to the target image frame, wherein the interaction control is configured to perform a control operation on a target display object in the target image frame; and in response to a triggering operation of a user on the interaction control, displaying an interactive page comprising the target display object, and applying the control operation on the target display object on the interactive page.

Computer program code for carrying out operations of the present disclosure may be written in one or more programming languages or a combination thereof, including but not limited to an object oriented programming language such as Java, Smalltalk, C++, and a conventional procedural programming language, such as "C" language or similar programming languages. The program code may be executed entirely on the user's computer, partly on the user's computer, as a stand-alone software package, partly on the user's computer and partly on a remote computer, or entirely on a remote computer or a server. In a scenario in which a remote computer is involved, the remote computer may be connected to the user's computer through any type of network, including a Local Area Network (LAN) or a Wide Area Network (WAN), or be connected to an external computer (for example, connected through the Internet using an Internet service provider).

The flowchart and block diagram in the drawings illustrate the architecture, functionality, and operation of possible implementations of the systems, methods and computer program products according to various embodiments of the present disclosure. In this regard, each block in the flowchart or block diagram may represent a module, program segment, or portion of code, which comprises one or more executable instructions for implementing a specified logical function. It should also be noted that, in some alternative implementations, the functions noted in the blocks may occur in an order different from the order noted in the drawings. For example, two blocks shown in succession may, in fact, be executed substantially concurrently, or the blocks may sometimes be executed in a reverse order, depending upon the functionality involved. It will also be noted that each block of the block diagram and/or flowchart, and combinations of blocks in the block diagram and/or flowchart, can be implemented by special purpose hardware-based systems that perform the specified functions or operations, or by combinations of special purpose hardware and computer instructions.

The modules involved in the embodiments of the present disclosure may be implemented by software or hardware. The name of the module does not in some cases constitute a limitation on the module itself.

The functions described herein above may be performed, at least in part, by one or more hardware logic components. For example, without limitation, exemplary types of hardware logic components that may be used include: Field Programmable Gate Array (FPGA), Application Specific Integrated Circuit (ASIC), Application Specific Standard Product (ASSP), system on chip (SOC), Complex Programmable Logic Device (CPLD), and the like.

In the context of this disclosure, a machine-readable medium may be a tangible medium that can contain, or store a program for use by or in connection with an instruction execution system, apparatus, or device. The machine readable medium may be a machine readable signal medium or a machine readable storage medium. The machine readable medium may include, but is not limited to, an electronic, magnetic, optical, electromagnetic, infrared, or semiconductor system, apparatus, or device, or any suitable combination of the foregoing. More specific examples of the machine readable storage medium would include an electrical connection based on one or more wires, a portable computer diskette, a hard disk, a Random Access Memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

According to one or more embodiments of the present disclosure, exemplary embodiment 1 provides a video-based interaction method, comprising:

when a target video is played to a target image frame, pausing playback of the target video, and displaying an obscuration comprising an interaction control on a current playback interface corresponding to the target image frame, wherein the interaction control is configured to perform a control operation on a target display object in the target image frame; and in response to a triggering operation of a user on the interaction control, displaying an interactive page comprising the target display object, and applying the control operation on the target display object on the interactive page.

According to one or more embodiments of the present disclosure, exemplary embodiment 2 provides the method of the exemplary embodiment 1, wherein a display position of the interaction control in the obscuration is determined by:

determining a display position of the target display object in the target image frame; and controlling the display position of the interaction control in the obscuration based on the display position of the target display object, so that the display position of the interaction control in the obscuration is within a display area range of the target display object.

According to one or more embodiments of the present disclosure, exemplary embodiment 3 provides the method of the exemplary embodiment 1 or 2, wherein the in response to the triggering operation of the user on the interaction control, displaying the interactive page comprising the target display object comprises:

in response to a long-press operation of the user on the interaction control, loading a long-press progress bar according to a long-press duration of the user on the interaction control; and after the long-press progress bar is completely loaded, displaying the interactive page comprising the target display object, wherein the long-press progress bar is completely loaded when the long-press duration reaches a preset long-press threshold.

According to one or more embodiments of the present disclosure, exemplary embodiment 4 provides the method of any one of the exemplary embodiments 1 to 3, wherein the obscuration has a preset display duration, the method further comprising:
displaying, on the obscuration, prompt content for guiding the user to perform the triggering operation on the interaction control, and determining a display duration of the prompt content; and
if the triggering operation of the user on the interaction control is not received under the condition that the display duration of the prompt content reaches a preset duration threshold, controlling the obscuration to disappear, and continuing to play the target video based on the target image frame after the obscuration disappears.

According to one or more embodiments of the present disclosure, exemplary embodiment 5 provides the method of the exemplary embodiment 4, before controlling the obscuration to disappear, the method further comprising:
displaying prompt content for characterizing a remaining display duration of the obscuration;
wherein the controlling the obscuration to disappear comprises:
controlling the obscuration to disappear while the remaining display duration of the obscuration returns to zero.

According to one or more embodiments of the present disclosure, exemplary embodiment 6 provides the method of the exemplary embodiment 4 or 5, the method further comprising:
obtaining card display content related to playing content of the target video and display position information corresponding to the card display content; and
after the obscuration disappears, displaying the card display content in a playback interface of the target video according to the display position information.

According to one or more embodiments of the present disclosure, exemplary embodiment 7 provides the method of any one of the exemplary embodiments 1-6, wherein the obscuration further comprises a replay control, the method further comprising:
controlling the obscuration to disappear in response to a triggering operation of the user on the replay control; and
after the obscuration disappears, controlling the target video to be replayed, and when the target video is replayed to the target image frame, redisplaying the obscuration comprising the interaction control on a current playback interface corresponding to the target image frame.

According to one or more embodiments of the present disclosure, exemplary embodiment 8 provides the method of any one of the exemplary embodiments 1-7, wherein the obscuration further comprises a conversion component, and the displaying the obscuration comprising the interaction control comprises:
displaying the obscuration comprising the interaction control in full screen;
the method further comprises:
in response to a triggering operation of the user on the conversion component, zooming out the obscuration to a first display area on a screen, and displaying a content detail page corresponding to the target video in a second display area on the screen, where the first display area and the second display area are different.

According to one or more embodiments of the present disclosure, exemplary embodiment 9 provides the method of any one of the exemplary embodiments 1 to 8, wherein the target video is a video related to a target application, the obscuration further comprises a download control, and the method further comprises:
in response to a triggering operation of the user on the download control, displaying a download page for downloading the target application so that the user downloads the target application on the download page; or
in response to the triggering operation of the user on the download control, downloading the target application, and displaying prompt content for characterizing a download progress of the target application in the obscuration.

According to one or more embodiments of the present disclosure, exemplary embodiment 10 provides a video-based interaction apparatus, comprising:
a first display module configured to, when a target video is played to a target image frame, pause playback of the target video, and display an obscuration comprising an interaction control on a current playback interface corresponding to the target image frame, wherein the interaction control is configured to perform a control operation on a target display object in the target image frame; and
a second display module configured to, in response to a triggering operation of a user on the interaction control, display an interactive page comprising the target display object, and apply the control operation on the target display object on the interactive page.

According to one or more embodiments of the present disclosure, exemplary embodiment 11 provides a computer readable medium having a computer program stored thereon, which, when executed by a processing means, implements the steps of the method of any one of the exemplary embodiments 1 to 9.

According to one or more embodiments of the present disclosure, exemplary embodiment 12 provides an electronic device comprising:
a storage means having a computer program stored thereon; and
a processing means configured to execute the computer program in the storage means, to implement the steps of the method of any one of the exemplary embodiments 1 to 9.

The foregoing description is only explanations of the preferred embodiments of the present disclosure and the technical principles used. It will be appreciated by those skilled in the art that the scope of disclosure involved in the present disclosure is not limited to a technical solution formed by a particular combination of the technical features described above, but also encompasses other technical solutions formed by any combination of the technical features described above or equivalents thereof without departing from the above concept of the disclosure, for example, technical solutions formed by replacing the above features and technical features having similar functions to those disclosed (but not limited to) in the present disclosure with each other.

Further, while various operations are depicted in a particular order, this should not be understood as requiring that the operations be performed in the particular order shown or in sequential order. Under certain circumstances, multitasking and parallel processing may be advantageous. Likewise, while several specific implementation details are included in the above discussion, these should not be construed as limitations on the scope of the disclosure. Certain features that are described in the context of separate embodiments can also be implemented in combination in a single embodiment. Conversely, various features that are described in the context of a single embodiment can also be implemented in multiple embodiments separately or in any suitable sub-combination.

Although the subject matter has been described in language specific to structural features and/or methodological acts, it is to be understood that the subject matter defined in the attached claims is not necessarily limited to the specific features or acts described above. Rather, the specific features and acts described above are merely disclosed as example forms of implementing the claims. With regard to the apparatus in the above embodiments, the specific manner in which each module performs the operation has been described in detail in the embodiments related to the method, and will not be described in detail here.

What is claimed is:

1. A video-based interaction method, comprising:
in response to a target video is played to a preset target image frame, pausing playback of the target video, and displaying an obscuration comprising an interaction control on a current playback interface corresponding to the target image frame, wherein the interaction control is configured to perform a control operation directly on a target display object itself, which serves as a display element of the target image frame; and
in response to a triggering operation of a user on the interaction control, displaying an interactive page comprising the target display object, and applying the control operation on the target display object on the interactive page,
wherein the obscuration further comprises a conversion component, and the displaying the obscuration comprising the interaction control comprises:
displaying the obscuration comprising the interaction control in full screen;
the method further comprises:
in response to a triggering operation of the user on the conversion component, zooming out the obscuration to a first display area on a screen, and displaying a content detail page corresponding to the target video in a second display area on the screen, where the first display area and the second display area are different.

2. The method according to claim 1, wherein a display position of the interaction control in the obscuration is determined by:
determining a display position of the target display object in the target image frame; and
controlling the display position of the interaction control in the obscuration based on the display position of the target display object, so that the display position of the interaction control in the obscuration is within a display area range of the target display object.

3. The method according to claim 1, wherein the in response to the triggering operation of the user on the interaction control, displaying the interactive page comprising the target display object comprises:
in response to a long-press operation of the user on the interaction control, loading a long-press progress bar according to a long-press duration of the user on the interaction control; and
after the long-press progress bar is completely loaded, displaying the interactive page comprising the target display object, wherein the long-press progress bar is completely loaded when the long-press duration reaches a preset long-press threshold.

4. The method according to claim 1, wherein the obscuration has a preset display duration, the method further comprising:
displaying, on the obscuration, prompt content for guiding the user to perform the triggering operation on the interaction control, and determining a display duration of the prompt content; and
if the triggering operation of the user on the interaction control is not received under the condition that the display duration of the prompt content reaches a preset duration threshold, controlling the obscuration to disappear, and continuing to play the target video based on the target image frame after the obscuration disappears.

5. The method according to claim 4, wherein, before controlling the obscuration to disappear, the method further comprises:
displaying prompt content for characterizing a remaining display duration of the obscuration;
wherein the controlling the obscuration to disappear comprises:
controlling the obscuration to disappear while the remaining display duration of the obscuration returns to zero.

6. The method according to claim 4, wherein the method further comprises:
obtaining card display content related to playing content of the target video and display position information corresponding to the card display content; and
after the obscuration disappears, displaying the card display content in a playback interface of the target video according to the display position information.

7. The method according to claim 1, wherein the obscuration further comprises a replay control, the method further comprising:
controlling the obscuration to disappear in response to a triggering operation of the user on the replay control; and
after the obscuration disappears, controlling the target video to be replayed, and when the target video is replayed to the target image frame, redisplaying the obscuration comprising the interaction control on a current playback interface corresponding to the target image frame.

8. The method according to claim 1, wherein the target video is a video related to a target application, the obscuration further comprises a download control, and the method further comprises:
in response to a triggering operation of the user on the download control, displaying a download page for downloading the target application so that the user downloads the target application on the download page; or
in response to the triggering operation of the user on the download control, downloading the target application, and displaying prompt content for characterizing a download progress of the target application in the obscuration.

9. A non-transitory computer readable medium having a computer program stored thereon, which, when executed by a processing means, cause the processing means to implement steps of:
in response to a target video is played to a preset target image frame, pausing playback of the target video, and displaying an obscuration comprising an interaction control on a current playback interface corresponding to the target image frame, wherein the interaction control is configured to perform a control operation directly on a target display object itself, which serves as a display element of the target image frame; and in response to a triggering operation of a user on the interaction control, displaying an interactive page comprising the target display object, and applying the control operation on the target display object on the interactive page, wherein the obscuration further comprises a conversion component, and the displaying the obscuration comprising the interaction control comprises:

displaying the obscuration comprising the interaction control in full screen;

wherein the computer program, when executed by a processing means, further cause the processing means to implement steps of:

in response to a triggering operation of the user on the conversion component, zooming out the obscuration to a first display area on a screen, and displaying a content detail page corresponding to the target video in a second display area on the screen, where the first display area and the second display area are different.

10. An electronic device comprising:

a storage means having a computer program stored thereon; and a processing means configured to execute the computer program in the storage means, to implement steps of:

in response to a target video is played to a preset target image frame, pausing playback of the target video, and displaying an obscuration comprising an interaction control on a current playback interface corresponding to the target image frame, wherein the interaction control is configured to perform a control operation directly on a target display object itself, which serves as a display element of the target image frame; and in response to a triggering operation of a user on the interaction control, displaying an interactive page comprising the target display object, and applying the control operation on the target display object on the interactive page, wherein the obscuration further comprises a conversion component, and the displaying the obscuration comprising the interaction control comprises:

displaying the obscuration comprising the interaction control in full screen;

wherein the processing means is further configured to execute the computer program in the storage means to implement steps of:

in response to a triggering operation of the user on the conversion component, zooming out the obscuration to a first display area on a screen, and displaying a content detail page corresponding to the target video in a second display area on the screen, where the first display area and the second display area are different.

* * * * *